Sept. 18, 1923.
A. E. DOMAN
1,468,006
REGULATING SYSTEM FOR ELECTRIC GENERATORS
Filed Nov. 21, 1919
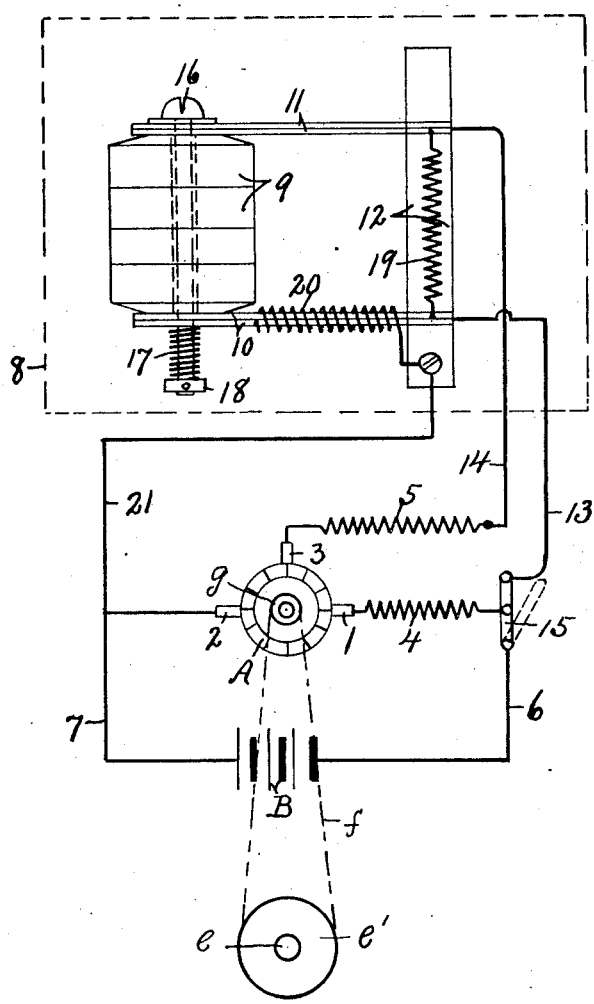
Inventor
A. E. Doman
By Howard P. Denison
Attorney.

Patented Sept. 18, 1923.

1,468,006

UNITED STATES PATENT OFFICE.

ALBERT E. DOMAN, OF ELBRIDGE, NEW YORK, ASSIGNOR TO DOMAN MANUFACTURING CORPORATION, OF ELBRIDGE, NEW YORK, A CORPORATION OF NEW YORK.

REGULATING SYSTEM FOR ELECTRIC GENERATORS.

Application filed November 21, 1919. Serial No. 339,548.

*To all whom it may concern:*

Be it known that I, ALBERT E. DOMAN, of Elbridge, in the county of Onondaga, in the State of New York, have invented new and useful Improvements in Regulating Systems for Electric Generators, of which the following, taken in connection with the accompanying drawings, is a full, clear, and exact description.

This invention relates to certain improvements in current regulators for variable speed dynamo electric machines of the "third brush" type adapted to be driven by an internal combustion motor of a motor vehicle in which a storage battery is commonly employed in connection with the dynamo to supply the necessary current for starting, lighting and ignition purposes and in which the battery is automatically charged by the dynamo current.

It is well known that a dynamo of this type serves in a measure to automatically regulate its current output and voltage under widely varying speeds, but, when charging a battery, as the latter becomes more fully charged, instead of gradually reducing the charge as the charging rate and battery voltage increases, it actually increases the charging rate which if continued under certain conditions will eventually ruin the battery by overheating as a result of overcharging.

The main object, therefore, is to provide a system of current or voltage regulation for use in connection with a "third brush" dynamo by which it will be practically impossible, under normal working conditions, to overcharge or overheat the battery under any speed and thereby to prolong the life and energy of the battery.

Another object is to provide simple and efficient means whereby a variable resistance carbon or analogous pile may be automatically cut into and out of the shunt field circuit of the dynamo according to the degree of such resistance and to cause said resistance to vary with the varying speeds of the dynamo.

A further object is to automatically control the pressure of the carbon elements and resultant degree of resistance by the current heat which may be developed in the dynamo or charging circuit.

A still further object is to compensate for any variations in external or atmospheric temperatures which might affect the degree of pressure of the carbon elements irrespective of the heating element.

Other objects and uses will be brought out in the following description.

The drawing represents diagrammatically the circuits of a storage battery and a "third brush" dynamo together with my improved current regulator system connected to said circuits.

As illustrated, the dynamo is preferably of the "third brush" type adapted to be driven at variable speeds by an internal combustion engine of a motor vehicle for supplying the necessary current for lighting, ignition, and charging purposes, said dynamo being indicated by a commutator —A— having opposite brushes —1— and —2—, and a third brush —3—, and also includes a series winding —4— and a shunt field winding —5—.

A storage battery —B— is connected by wires —6— and —7— across the terminals of the main dynamo circuit to be charged by the current therefrom and may also be used for starting, lighting, and ignition purposes.

*Current regulator.*

The current or voltage regulator which forms the subject matter of my present invention may be enclosed within a suitable case —8— indicated by dotted lines and constitutes a separate article of manufacture capable of being easily and quickly installed in a motor vehicle and conveniently connected to the dynamo and battery circuits.

A carbon or analogous variable resistance pile —9— is supported by and between the free ends of a pair of thermostatic bars —10— and —11—, having their opposite ends secured to a supporting base —12— and electrically connected by wires —13— and —14— to an electrical switch and to one end of the shunt field winding —5— respectively, so that the carbon pile may be connected in series with the shunt field winding —5— leading to the third brush —3— of the dynamo.

A bolt —16— is passed through registering apertures in the elements of the pile —9— and bars —10— and —11— to hold said parts in operable relation and is adapted to receive a spring —17— interposed between a shoulder —18— and the bar —10— for pressing said parts together with a certain degree of pressure and thereby reducing the resistance which varies inversely with the pressure, the shoulder —18— being adjustable on the bolt to vary the pressure between the elements of the carbon —9— and to thereby vary the resistance at will.

A resistance coil —19— is electrically connected across the thermostatic bars —10— and —11— in shunt with the carbon pile —9— and is therefore in series with the switch —15— and shunt field winding —5— respectively so as to positively assure a maintenance of a circuit in the shunt field circuit of the dynamo in case the members of the carbon pile —9— should become entirely separated.

The thermostatic bars —10— and —11— are similar in that each is composed of strips of metal of different coefficients of expansion, those of each bar being arranged to deflect in the same direction under varying external or atmospheric changes without appreciably varying the resistance in the pile —9— or tension of the spring —17—.

The resistance of the carbon pile —9— is, however, automatically regulated or varied by current heat developed in the circuit in which said pile is connected and for this purpose an electric heater coil —20— surrounding one of the thermostatic bars, as —10—, is connected across the terminals of the dynamo and battery circuits, one end of said coil being electrically connected to the bar —10— and its other end connected by a wire —21— to the corresponding poles —2— and —7— of the dynamo and battery circuits.

Operation.

Assuming now that the switch —15— which controls both the dynamo and battery circuits is closed and that the spring —17— is exerting a certain amount of pressure upon the elements of the carbon pile —9—, then it is evident that the current heat in the coil —20— will be gradually increased as the speed of the dynamo increases and that this increasing heat will be imparted to and deflect the free end of the thermostatic bar —10— away from the carbon pile —9— and against the action of the spring —17—, thereby reducing the pressure between the elements of said pile and correspondingly increasing the resistance thereof so that the resistance in the shunt field circuit will be greatly increased with the increased speed of the dynamo to regulate the current output or voltage of said dynamo within such limits as may be required for the safe charging of the battery without overheating or overcharging, it being understood that the amount of current passing through the resistance —19— will vary indirectly with the pressure exerted between the members of the carbon pile, and that the introduction of this gradually increasing resistance in the shunt field circuit of the "third brush" type dynamo has the effect of limiting the current output of said dynamo as its speed increases.

The dynamo is shown as connected by pulleys —g— and —e'— and a belt —f— to the crank shaft —c— of an internal combustion engine to be driven thereby and also constitutes an electric motor receiving current for charging, lighting, and ignition purposes, as previously explained.

What I claim is:—

1. A voltage regulator for variable speed dynamo electric machines comprising thermostatic bars, adapted to form a part of the dynamo circuit and arranged to flex in the same direction under like temperatures, an electric resistance pile supported under pressure by and between the flexing portions of said bars, and an electric heater adjacent one of said bars and adapted to be connected across the dynamo circuit to cause a variation of said pressure as the speed of the dynamo varies.

2. A voltage regulator for variable speed dynamo electric machines comprising thermostatic bars adapted to be arranged in opposite sides of the dynamo circuit and adjusted to flex in the same direction under like temperatures, an electric resistance pile supported under pressure by and between said bars, and an electric heater coil wound around one of the bars and adapted to be connected across the dynamo circuit.

In witness whereof I have hereunto set my hand this 5th day of November, 1919.

ALBERT E. DOMAN.

Witnesses:
H. E. CHASE,
MARGARET L. STOUP.